UNITED STATES PATENT OFFICE 2,230,784

PRINTING PLATE AND UNIT

Walter Reppe and Adolf Freytag, Ludwigshafen-on-the-Rhine, Germany, assignors to I. G. Farbenindustrie Aktiengesellschaft, Frankfort-on-the-Main, Germany No Drawing. Application May 13, 1939, Serial No. 273,421. In Germany May 16, 1938

4 Claims. (Cl. 101—395)

The present invention relates to printing plates and printing units.

It has already been proposed to replace the type metal hitherto used for printing units, especially printing types, and also printing plates by organic substances, as for example phenol-aldehyde resins or polystyrene. These substances have, however, not fulfilled the high requirements placed on them during use. To serve as a material for printing units, the substances must not be too brittle, since otherwise stresses, which occur during the preparation or use of the printing units and plates, may give rise to their destruction, but on the other hand the hardness of the substances must be so great that all the details of a picture, ornamentation or a script are accurately reproduced. Even after the greatest possible number of prints, the units and plates must be unchanged even in all the details. Since the printing units become dirty in use, they must frequently be cleaned with solvents, benzine and motor fuel compositions, as for example mixtures of preponderating amounts of benzine with benzene and alcohol, proving especially suitable for this purpose. The printing units must naturally be insoluble in these solvents and must not even swell on contact therewith since otherwise the reproduction is not exact in all the details. Moreover, for a useful employment of the printing units and plates, it is necessary that they may be recast to new units and plates as frequently as possible without being adversely changed. Phenol-aldehyde resins cannot be recast because in the hardened state they are no longer fusible. Polystyrene has proved too brittle for the production of printing units. Moreover, it is not sufficiently stable to benzines.

We have now found that polymerised methacrylic acid methyl ester or interpolymerisation products of preponderating amounts of methacrylic acid methyl ester with styrene, acrylic nitrile or methacrylic nitrile and if desired small amounts, e. g. up to 25 per cent (of the whole mixture), of further unsaturated organic compounds capable of interpolymerising with the aforesaid substances especially of such having a plurality of reactives unsaturated carbon linkages can be used with advantage for the preparation of printing units and plates. Interpolymerisation products of preponderating amounts of methacrylic acid methyl ester which preferably have been prepared by polymerisation in aqueous emulsion are especially suitable. The substances thus obtained are distinguished by good hardness, great toughness, complete insolubility in benzine and good stability to motor fuel compositions, as for example mixtures of preponderating amounts of benzine, with benzene and alcohol. The stability of the interpolymerisation products to motor fuels may be increased by interpolymerising methacrylic methyl ester or mixtures of methacrylic acid methyl ester and styrene, acrylic nitrile or methacrylic nitrile with polymerisable compounds having a plurality of reactive unsaturated carbon linkages, as for example butadiene, divinylbenzene or also diethylene glycol divinyl ether, and also vinyl esters of unsaturated acids, as for example crotonic acid vinyl ester.

The interpolymerisation products obtained may be used alone or mixed with dyestuffs or fillers. The dyestuffs or fillers may be added during the preparation of the substances, as for example to the emulsions of the monomers or polymers when polymerising in aqueous emulsion, or to the monomers when polymerising in a block.

The said polymerisation products may be used with special advantage to replace the type metal hitherto used. By reason of their lower specific gravity as compared with type metal, they facilitate in particular the practical handling.

The substances may be repeatedly recast and used again for the preparation of fresh printing units and plates.

What we claim is:

1. Printing plates and printing units comprising a polymerization product of methacrylic acid methyl ester.

2. Printing plates and printing units comprising an interpolymerisation product of methacrylic acid methyl ester and styrene.

3. Printing plates and printing units comprising an interpolymerisation product of methacrylic acid methyl ester and a nitrile selected from the group consisting of acrylic nitrile and methacrylic nitrile.

4. Printing plates and printing units comprising an interpolymerisation product of methacrylic acid methyl ester comprising as a component part thereof a polymerisable substance containing a plurality of reactive unsaturated carbon linkages.

WALTER REPPE,
ADOLF FREYTAG.